US009714882B2

(12) United States Patent
Kamiyama et al.

(10) Patent No.: US 9,714,882 B2
(45) Date of Patent: Jul. 25, 2017

(54) LEAKAGE INSPECTION METHOD OF HEAT EXCHANGER

(75) Inventors: Naoyuki Kamiyama, Tokyo (JP);
Tsuyoshi Miyachi, Tokyo (JP); Takuya Okamoto, Tokyo (JP); Yuichiro Sato, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 407 days.

(21) Appl. No.: 14/001,432

(22) PCT Filed: Nov. 10, 2011

(86) PCT No.: PCT/JP2011/075981
§ 371 (c)(1),
(2), (4) Date: Aug. 23, 2013

(87) PCT Pub. No.: WO2012/117620
PCT Pub. Date: Sep. 7, 2012

(65) Prior Publication Data
US 2013/0327128 A1    Dec. 12, 2013

(30) Foreign Application Priority Data

Feb. 28, 2011   (JP) ................... 2011-043315

(51) Int. Cl.
G01M 3/02    (2006.01)
G01M 3/00    (2006.01)
G01M 3/32    (2006.01)

(52) U.S. Cl.
CPC .............. *G01M 3/02* (2013.01); *G01M 3/002* (2013.01); *G01M 3/3227* (2013.01); *G01M 3/3245* (2013.01)

(58) Field of Classification Search
CPC ...... G01M 3/002; G01M 3/02; G01M 3/3227; G01M 3/3245; G01M 3/26; G01M 3/28; F25B 2500/222; F25B 49/005
See application file for complete search history.

(56) References Cited

U.S. PATENT DOCUMENTS 3,992,894 A  * 11/1976  Antonetti ................ F25D 17/02
                                              137/558
4,738,304 A  *  4/1988  Chalmers ............... B64G 1/503
                                              165/11.1
(Continued)

FOREIGN PATENT DOCUMENTS

JP    62-005152 A    1/1987
JP    11-304138 A   11/1999
(Continued)

OTHER PUBLICATIONS

English Translation of the Written Opinion of International Application No. PCT/JP2011/075981, mailing date of Jan. 17, 2012.
(Continued)

*Primary Examiner* — Daniel S Larkin
(74) *Attorney, Agent, or Firm* — Westerman, Hattori, Daniels & Adrian, LLP

(57) ABSTRACT

When a liquid level is changed even though an inflow of a heat medium into a specific heat transfer tube bundle is stopped, it is determined that there is no abnormality in the heat transfer tube bundle in which the inflow of the heat medium is stopped and then another heat transfer tube bundle is inspected. Next, when the inflow of the heat medium into the specific heat transfer tube bundle is stopped not to cause the change in the liquid level, it is determined that there is an abnormality in the heat transfer tube bundle to which the inflow of the heat medium is stopped. Thus, it is possible to determine that there is an abnormality in the (Continued)

heat transfer tube bundle in which the inflow of the heat medium is stopped.

2 Claims, 4 Drawing Sheets

(56) References Cited

U.S. PATENT DOCUMENTS

| | | | |
|---|---|---|---|
| 7,270,174 B2* | 9/2007 | Chu | H05K 7/2079 165/11.1 |
| 2011/0000234 A1* | 1/2011 | Nishimura | F25B 49/005 62/77 |

FOREIGN PATENT DOCUMENTS

| | | |
|---|---|---|
| JP | 3643241 B2 | 4/2005 |
| JP | 2007-192537 A | 8/2007 |
| JP | 2009-222569 A | 10/2009 |
| JP | 2010-255972 A | 11/2010 |

OTHER PUBLICATIONS

Written Opinion dated Jan. 17, 2012, issued in corresponding application No. PCT/JP2011/075981.
International Search Report dated Jan. 17, 2012, issued in corresponding application No. PCT/JP2011/075981.

* cited by examiner

LEAKAGE INSPECTION METHOD OF HEAT EXCHANGER

FIELD

The present invention relates to a leakage inspection method of a heat exchanger.

BACKGROUND

As a general example of a system configuration, an air pollution control apparatus of a boiler for thermal power plant or chemical plant is disposed in order of denitrification equipment in a flue gas flow channel, an air-preheater air heater, a heat recovery unit of reheating gas-gas heater, a dry electronic precipitator, wet desulfurization equipment, a reheating unit for the gas-gas heater, and a chimney. Here, the gas-gas heater is configured such that the heat recovery unit and the reheating unit are connected to a cool and hot water circulating line to perform a heat exchange with a flue gas through a circulating pump using water as a medium.

In this control apparatus, the flue gas of the boiler is guided to the air heater to be cooled to a temperature of, for example, 130 to 150° C. by exchanging heat with combustion air and then is guided to the heat recovery unit of the gas-gas heater to be further cooled. Thereafter, after the flue gas is guided to the electronic precipitator to remove fly ashes, a high-temperature flue gas in an outlet of the electronic precipitator is further cooled to a low temperature by exchanging heat with water and then is guided to the wet desulfurization equipment. In the wet desulfurization equipment, $SO_2$ contained in the flue gas is absorbed and removed by absorber which is prepared by dissolving, for example, limestone in the form of slurry and remaining fly ashes in the flue gas are also removed in the gas-solution contact process. Then, the flue gas in which $SO_2$ and the fly ashes are removed is guided to the reheating unit of the gas-gas heater. Here, the temperature of the flue gas temperature-dropped by $SO_2$ absorber and the like in the treatment process of the wet desulfurization equipment is raised by the heat exchange with heat medium water passing through an interior of a pipe disposed in the reheating unit of the gas-gas heater. This causes functions of preventing white smoke generation due to a reduction of the amount of water condensation and improving diffusion efficiency due to temperature rise, when the flue gas is released from the chimney to an atmosphere.

For example, a fin tube heat exchanger has been proposed as a heat exchange method of large-scaled heat recovery unit and reheating unit of the gas-gas heater in coal-fired power plant (Patent Literature 1).

CITATION LIST

Patent Literature

Patent Literature 1: Japanese Patent Application Laid-open No. 11-304138

SUMMARY

Technical Problem

In a case of performing maintenance of heat transfer bundles in a heat exchanger, however, following problems occur.

1) When wear over time occurs due to blast effect of combustion fly ashes to a heat transfer tube of a fin tube heat exchanger in a thermal power plant, or when the composition of the same ashes has adhesive properties and corrosive properties, the ashes are fixed to a heat transfer surface to proceed corrosion of the heat transfer tube, a thickness of the tube is decreased with time.

When an unplanned stop is caused by massive update or maintenance of the bundles, damage of power sales occurs due to inhibition of a commercial operation. For this reason, leakage of heat medium water has been a very important issue.

2) As a monitoring method of grasping a heat medium leakage, there is a method of detecting a water level of a heat medium tank. In this method, when the water level is dropped to a predetermined level, a control device gives an alarm. When the alarm is activated, it estimates (confirms whether or not a drawdown of the heat medium tank occurs by closing heat medium in/out valves one by one) whether the leakage occurs in a heat recovery side or in a reheating side and then performs an airtight leak check with respect to an individual bundle of the specified side to perform additionally a refinement repair on a leakage tube location of the leakage bundle with an airtight test.

Detection by the water level of the heat medium tank takes several hours per one bundle with stability time rule of flue gas/heat medium temperature, and the airtight test takes a few minutes per one location. Moreover, when the leakage locations are increased with time, it is very difficult to specify the leakage locations.

The present invention has been achieved to solve the above problems, and an object of the present invention is to provide a leakage inspection method of a heat exchanger that can achieve shortening of leakage inspection time.

Solution to Problem

According to a first aspect of the present invention in order to solve the above mentioned problems, there is provided a leakage inspection method of a heat exchanger where a plurality of heat transfer tube bundles for heat recovery or heat exchange are disposed with predetermined intervals in a gas flowing direction of a flue gas, the leakage inspection method including: providing headers for common heat medium that are provided at a front and a back of each of the heat transfer tube bundles to distribute a heat medium to each of the heat transfer tube bundles which constitute the heat transfer bundles, heat medium lines that allows the headers for common heat medium and each of the heat transfer tube bundles to be connected to each other and that are provided with solenoid valves which supply and stop the heat medium to each of the heat transfer tube bundles, and a control means that performs control for stopping an inflow of the heat medium into a specific heat transfer tube bundle by operating the solenoid valves during a leakage of the heat medium; stopping the inflow of the heat medium into the specific heat transfer tube bundle; confirming that an operating state of remaining heat transfer tube bundles becomes normal; confirming a change in a liquid level of a heat medium tank which supplies the heat medium; and performing a leakage inspection of the heat medium.

According to a second aspect of the present invention, there is provided the leakage inspection method of the heat exchanger according to the first aspect, wherein in the performing of the leakage inspection of the heat medium, it is determined that there is no abnormality in the heat transfer tube bundle in which the inflow of the heat medium is stopped and another heat transfer tube bundle is inspected, when the change in the liquid level of the heat medium is caused even though the inflow of the heat medium into the specific heat transfer tube bundle is stopped.

According to a third aspect of the present invention, there is provided the leakage inspection method of the heat exchanger according to the first aspect, wherein in the performing of the leakage inspection of the heat medium, it is determined that there is an abnormality in the heat transfer tube bundle in which the inflow of the heat medium is stopped when the inflow of the heat medium into the specific heat transfer tube bundle is stopped not to cause the change in the liquid level.

According to a third aspect of the present invention, there is provided the leakage inspection method of the heat exchanger according to the second or third aspects, wherein, by considering a temperature change of the heat medium which circulates at the time of stopping the inflow of the heat medium and correcting a density of the heat medium every predetermined time, the change in the liquid level is determined based on the corrected density of the heat medium in the performing of the leakage inspection of the heat medium.

According to a fourth aspect of the present invention, there is provided the leakage inspection method of the heat exchanger according to any one of the first to fourth aspects, wherein the stopping of the inflow of the heat medium into the specific heat transfer tube bundle is performed at least one or more times.

Advantageous Effects of Invention

According to the present invention, it is possible to bypass each bundle by providing solenoid valves at an inlet and an outlet of each bundle and providing headers for common heat medium, to operate each of the solenoid valves through, for example, remote monitoring, and to grasp rapidly detection of leakage locations in conjunction with a liquid level detection of a heat medium tank.

BRIEF DESCRIPTION OF DRAWINGS

FIG. 1-2 is a schematic view of the heat exchanger.
FIG. 2 is a configuration diagram of a pipe of a heat exchanger according to a first embodiment.

DESCRIPTION OF EMBODIMENTS

Embodiments of the present invention will be described below in detail with reference to the accompanying drawings. The present invention is not limited to the following embodiments, but may be constituted in combination with each of embodiments in case of several embodiments. In addition, constituent elements in the following embodiments include those that can be easily assumed by persons skilled in the art or that are substantially equivalent.

First Embodiment

Figure 3:
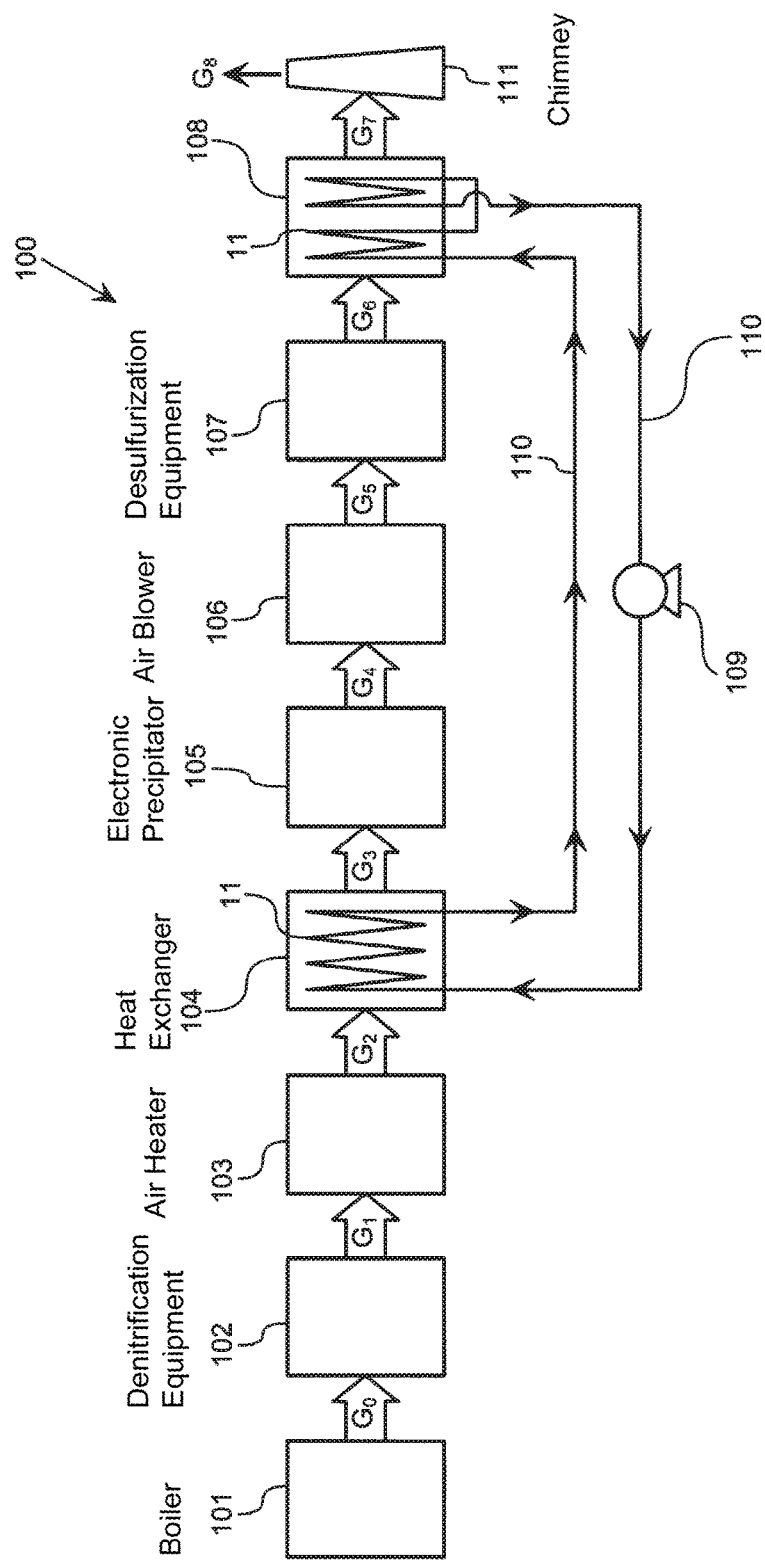
FIG. 3 is a schematic view of an air pollution control system to which the heat exchangers according to the embodiments are applied.

FIG. 3 is a schematic view of an air pollution control system to which heat exchangers according to the present embodiment are applied.

In a process where a flue gas to be discharged from a boiler 101 of power plants, factories or the like is released from a chimney 111, as illustrated in FIG. 3, an air pollution control system 100 removes nitride oxide (NOx), soot dust, and sulfur oxide (SOx) contained in the flue gas.

Firstly, a flue gas $G_0$ discharged from the boiler 101 is introduced into denitrification equipment 102 filled with a catalyst. In the denitrification equipment 102, the nitrogen oxide contained in the flue gas $G_0$ is reduced to water and nitrogen by ammonia ($NH_3$) injected as a reducing agent to become harmless.

A flue gas $G_1$ discharged from the denitrification equipment 102 is generally cooled to a temperature of 130° C. to 150° C. through an air heater (AH) 103.

A flue gas $G_2$ passed through the air heater 103 is introduced into a heat recovery unit 104 serving as a heat exchanger of gas-gas heater and then is heat-recovered by a heat exchange with a heat medium (for example, water). A temperature of a flue gas $G_3$ passed through the heat recovery unit 104 becomes approximately 85° C. to 110° C. to improve dust-collecting capability of an electronic precipitator (EP) 105, for example.

The flue gas $G_3$ passed through the heat exchanger 104 is introduced into the electronic precipitator 105 and then the shoot dust therein is removed.

A flue gas $G_4$ passed through the electronic precipitator 105 is pressurized by an air blower 106 to be driven by an electric motor. In addition, the air blower 106 may not be provided, or may be disposed on a downstream $G_7$ of a reheating unit of the gas-gas heater.

A flue gas $G_5$ pressurized by the air blower 106 is introduced into desulfurization equipment 107. In the desulfurization equipment 107, the sulfur oxide contained in the flue gas $G_5$ is absorbed and removed by an absorbent which is prepared by dissolving a lime stone in a form of slurry, and gypsum (not illustrated) is produced as a by-product. Then, the temperature of a flue gas $G_6$ passed through the desulfurization equipment 107 is generally decreased to about 50° C.

Figure 4:
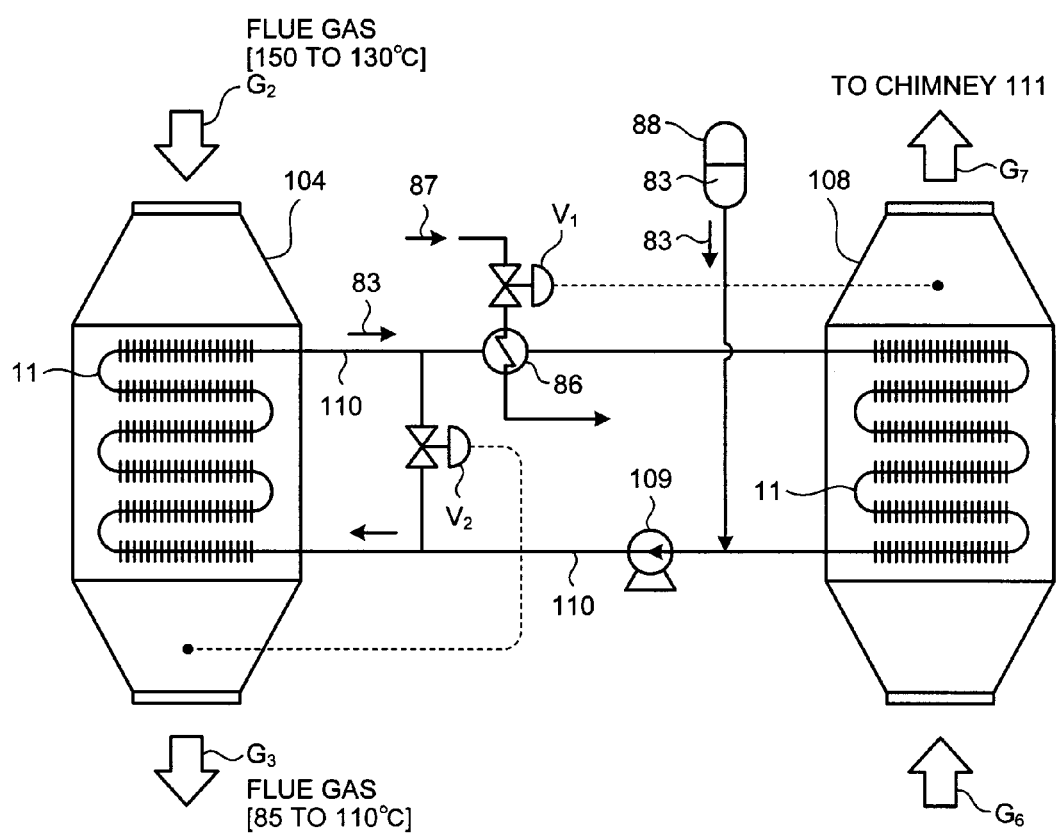
FIG. 4 is a schematic view of the heat exchanger of a flue gas treatment installation.

FIG. 4 is a schematic view of the heat exchanger of a flue gas treatment installation. As illustrated in FIG. 4, the flue gas $G_6$ passed through the desulfurization equipment 107 is introduced into the reheating unit 108 serving as the heat exchanger of the gas-gas heater. In a process where a heat medium 83 is circulated while coming and going a pair of circulating pipes 110 between the heat recovery unit 104 and the reheating unit 108 by a circulating pump 109, the reheating unit 108 heats the flue gas $G_6$ by recovery heat which is recovered by the heat recovery unit 104. Here, the flue gas $G_6$, which has the temperature of about 50° C., at an outlet of the desulfurization equipment 107 is reheated to about 85° C. to 110° C. by the reheating unit 108, and then is released from the chimney 111 to an atmosphere.

As illustrated in FIG. 4, the heat exchanger in which the flue gas $G_2$ is introduced to exchange heat with the heat medium 83 is provided.

The heat exchanger has the circulating pipe 110 for circulating the heat medium 83 between the heat recovery unit 104 and the reheating unit 108. The heat medium 83 is circulated between the heat recovery unit 104 and the reheating unit 108 through the circulating pipe 110. A surface of the heat medium circulating passage 110 provided in each of the heat recovery unit 104 and the reheating unit 108 is provided with a heat transfer tube 11 on which a plurality of fins are provided. A heat exchanging unit 86 is provided in the heat medium circulating passage 110 to compensate energy, which is equivalent to temperature drop absorbed by radiant heat when the heat medium 83 is circulated, by heating with a steam 87 and to be capable of maintaining and adjusting a medium temperature of the heat medium 83.

The heat medium 83 is supplied to the heat medium circulating passage 110 from a heat medium tank 88. The heat medium 83 is circulated in the heat medium circulating passage 110 by the heat medium circulating pump 109. In addition, a supply quantity of the steam 87 is adjusted by an adjusting valve V1 according to the gas temperature of the purified gas G6 from the desulfurization equipment 107, the heat medium 83 to be fed into the reheating unit 108 is supplied to the heat recovery unit 104 by an adjusting valve V2 according to the gas temperature of the flue gas G3 discharged from the heat recovery unit 104, and thus a supply quantity of the heat medium 83 to be fed into the reheating unit 108 is adjusted. Further, the purified gas G7 discharged from the reheating unit 108 is discharged from the chimney 111 to the outside.

Figure 1:
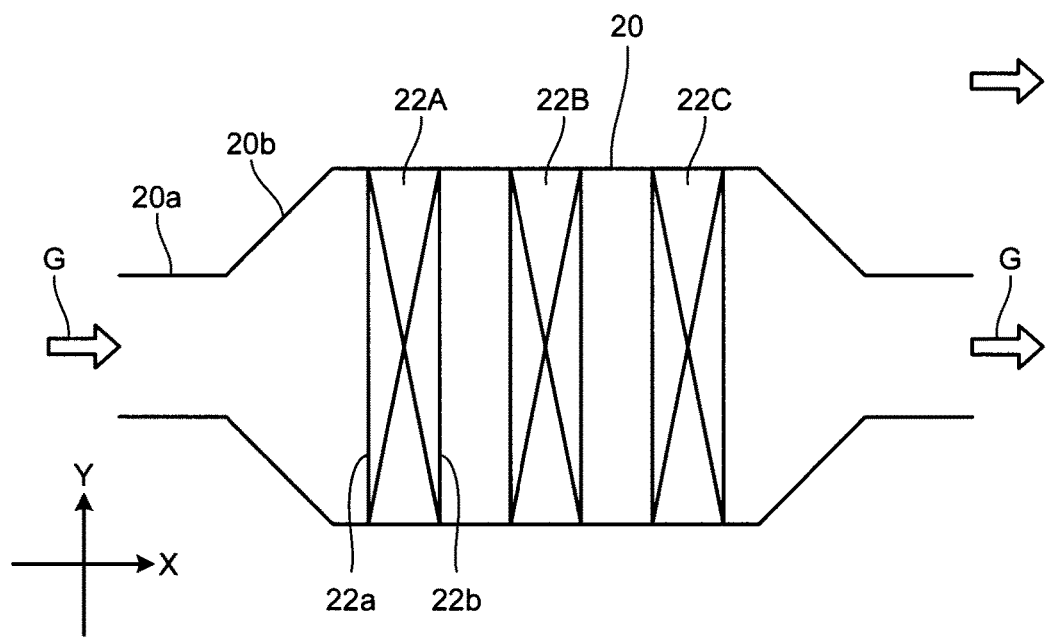
FIG. 1-1 is a schematic view of a heat exchanger.
Figures 1, 2:
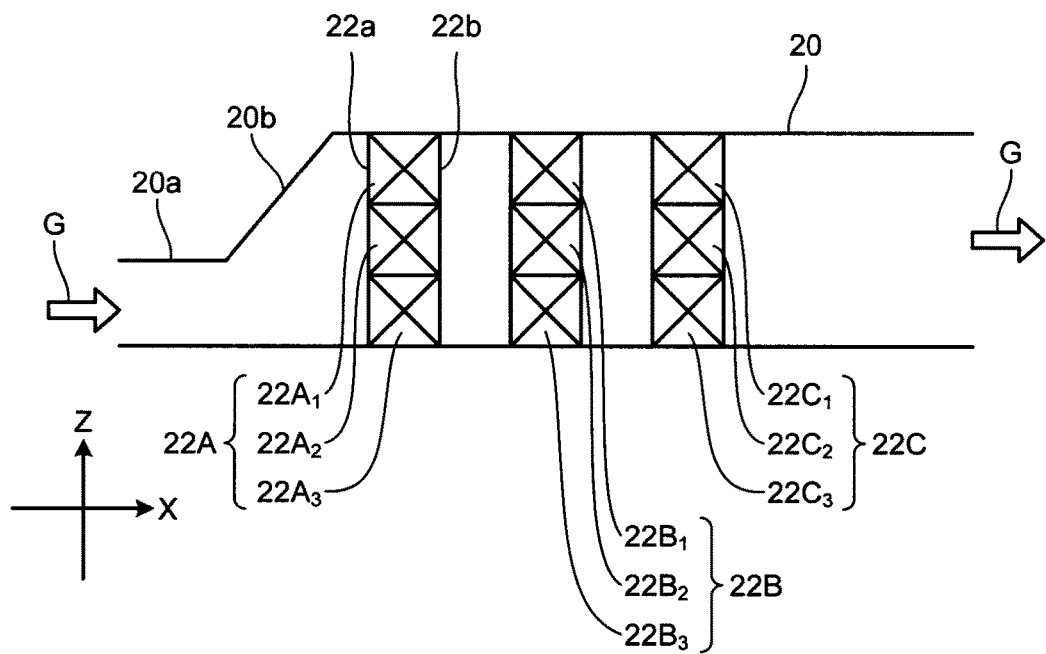
Figure 2:
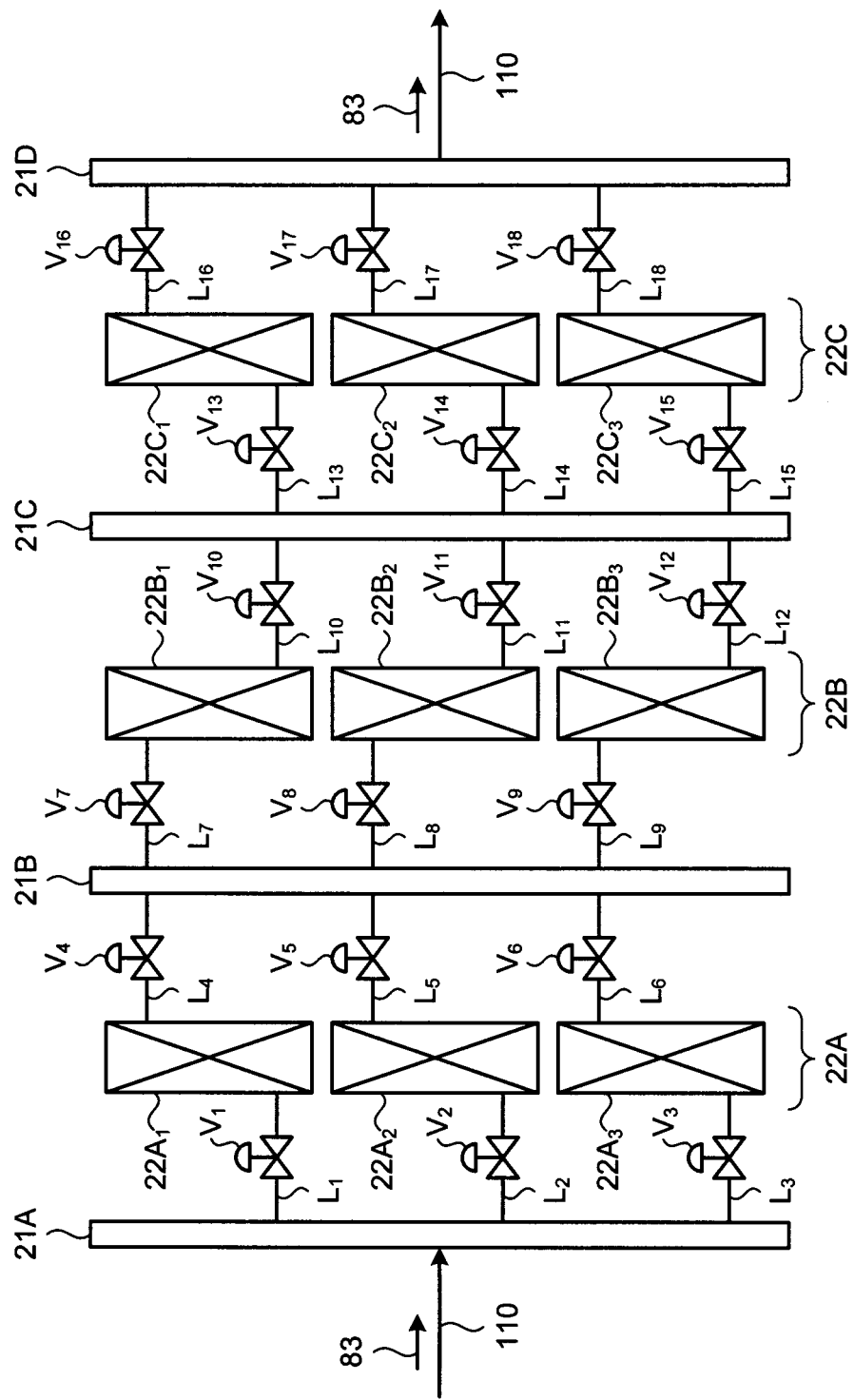

Hereinafter, a leakage inspection method of the heat recovery unit according to the present embodiment will be described. FIGS. 1-1 and 1-2 are a schematic view of the heat exchanger, respectively.

As illustrated in FIGS. 1-1 and 1-2, the heat exchanger includes a heat transfer tube bundle housing duct 20 having a plurality of heat transfer tube bundles which is an aggregation obtained by binding together the heat transfer tube bundle. That is, a high-temperature heat transfer tube bundle 22A, a middle-temperature heat transfer tube bundle 22B, and a low-temperature heat transfer tube bundle 22C are disposed from an upstream side in an inflowing direction of the flue gas.

Further, the plurality of heat transfer tube bundles 22A (22A$_1$ to 22A$_3$), 22B (22B$_1$ to 22B$_3$), and 22C (22C$_1$ to 22C$_3$) are disposed with a predetermined interval to perform the heat recovery or the heat exchange in a gas flowing direction of the flue gas. In FIG. 1, a symbol G denotes the flue gas, and reference numerals 20a and 20b denote a duct inlet part and an expanded part, respectively. In addition, an upstream side in a flue gas introducing direction of the heat transfer tube bundle is a front 22a, and a downstream side in the flue gas introducing direction is a rear 22b.

In drawings, an X-direction is the flue gas flowing direction, a Y-direction is an insertion direction of the heat transfer tube bundle, and a Z-direction is a stacked installation direction of the heat transfer tube bundle.

FIG. 2 is a configuration diagram of a pipe of the heat exchanger according to the first embodiment.

In FIG. 2, the plurality of heat transfer tube bundles which is an aggregation which binds together the heat transfer tube bundle stored in the heat exchanger are disposed. That is, the high-temperature bundle 22A, the middle-temperature bundle 22B, and the low-temperature bundle 22B are disposed from the upstream side in the inflowing direction of the flue gas.

Further, the plurality of heat transfer tube bundles 22A (22A$_1$ to 22A$_3$), 22B (22B$_1$ to 22B$_3$), and 22C (22C$_1$ to 22C$_3$) are disposed with a predetermined interval to perform the heat recovery or the heat exchange in a gas flowing direction of the flue gas.

Headers 21A, 21B, 21C, and 21D for common heat medium are provided at the front and the back of each of the heat transfer tube bundles 22A, 22B, and 22C to distribute the heat medium 83 to each of the heat transfer tube bundles 22A$_1$ to 22A$_3$ . . . which constitute the heat transfer bundle.

In addition, the headers 21A, 21B, 21C, and 21D for common heat medium are connected to each of the heat transfer tube bundles 22A$_1$ to 22A$_3$ . . . through heat medium lines $L_1$ to $L_{18}$.

The heat medium lines $L_1$ to $L_{18}$ are provided with solenoid valves $V_1$ to $V_{18}$ which supply and stop the heat medium 83 to each of the heat transfer tube bundles 22A$_1$ to 22A$_3$ . . . .

Further, a control means is provided to perform control for stopping an inflow of the heat medium into a specific heat transfer tube bundle by operating the solenoid valves during a leakage of the heat medium 83.

To perform a leakage inspection, the inflow of the heat medium into the specific heat transfer tube bundle 22A$_1$ is first stopped, and then an operation in the remaining heat transfer tube bundles other than the specific heat transfer tube bundle 22A$_1$ is continued. Then, it confirms that an operation state becomes normal to check a liquid level change of a heat medium tank which supplies the heat medium.

Then, the leakage inspection is performed according to whether or not the liquid level is changed. During the inspection, the temperature of the heat medium may also be changed by a temperature change of the flue gas, for example. At this time, since the liquid level varies with density changes even when the heat medium is not leaked, it is necessary to determine whether or not the liquid level is changed by performing a density correction calculation. In consideration of this, it may rapidly find whether or not the liquid level is decreased by providing a function which automatically calculates the density correction from the heat medium temperature of the heat medium tank.

Therefore, it is possible to properly determine the liquid level change in the leakage inspection of the heat medium by considering the temperature change of the heat medium which circulates at the time of the stop, correcting the density of the heat medium every predetermined time, and determining the liquid-level change with the corrected density of the heat medium.

That is, the leakage inspection of the heat medium is performed by first measuring the liquid level and measuring the temperature of the heat medium which circulates at the time of the stop. From the result of the temperature measurement, it is possible to rapidly determine whether or not the liquid level in the heat medium tank is decreased by correcting the density of the heat medium and automatically calculating the density correction of the heat medium from the heat medium temperature of the heat medium tank during the inspection.

When the determination is automatically performed, the density correction is performed each time by determining the temperature change every five to ten minutes, for example.

Since the inspection may be performed by only operating the solenoid valves $V_1$ to $V_{18}$ provided in the heat medium lines $L_1$ to $L_{18}$, workers are unnecessary and the leakage inspection by a remote monitoring can be performing.

The inspection contents on whether or not the leakage occurs will be described in detail below.

In the leakage inspection, it is determined that there is no abnormality in the heat transfer tube bundle 22A$_1$ in which the inflow of the heat medium is stopped when the liquid level is changed even though the inflow of the heat medium into the specific heat transfer tube bundle (for example, 22A$_1$) is stopped, and then another heat transfer tube bundle is inspected.

That is, when the liquid level is still changed even though the inflow of the heat medium into the heat transfer tube bundle $22A_1$ is stopped, it is possible to determine that there is a normality in the heat transfer tube bundle $22A_1$ in which the inflow of the heat medium is stopped.

In the leakage inspection, it is determined that there is an abnormality in the heat transfer tube bundle $22A_1$ in which the inflow of the heat medium is stopped when the liquid level is not changed even though the inflow of the heat medium into the specific heat transfer tube bundle $22A_1$ is stopped. Then, it is possible to determine that there is an abnormality in the heat transfer tube bundle $22A_1$ in which the inflow of the heat medium is stopped.

In addition, the inspection may be performed on two or more heat transfer tube bundles, at the same time.

That is, the leakage inspection may also be performed such that the inflow of the heat medium into the specific heat transfer tube bundle is stopped at least one or more times and the inflow of the heat medium into the plurality of bundles is simultaneously stopped.

Accordingly, it is possible to bypass each bundle by providing the solenoid valves at an inlet and an outlet of each bundle and providing the headers for common heat medium and to operate each of the solenoid valves through, for example, remote monitoring. As a result, it is possible to grasp rapidly detection of leakage locations in conjunction with the liquid level detection of the heat medium tank.

In the related arts, since the inspection time is required when the leakage location of heat medium is specified, there is difficulty in performing continuously the leakage inspection of the heat medium in a plurality of other bundles in which the heat medium leakage is confirmed. However, according to the present invention, it is possible to perform the leakage inspection of all heat transfer tube bundles by carrying out opening and closing operation of the solenoid valves. Further, according to the present invention, since the leakage inspection of the heat medium is simultaneously carried out on the plurality of bundles which require the repair, it is also possible to perform a final confirmation of the combination of bundle locations by bypassing all bundles suspected to have the leakage of the heat medium at a time.

In addition, since the leakage inspection may remotely be monitored, it is also possible to centrally monitor by building a network which monitors a plurality of boiler installations.

In addition, in the present invention, the leakage detection is confirmed depending on the change in water level of the liquid level in the heat medium tank, but the present invention is not limited thereto. For example, a flue gas in the heat recovery unit and the reheating unit of the gas-gas heater may cause a rise in pressure loss when the heat medium is leaked. Accordingly, the present invention may also monitor the pressure loss.

REFERENCE SIGNS LIST 21A to 21D Headers for Common Heat Medium
22A to 22C Heat Transfer Tube Bundle
83 Heat Medium
$V_1$ to $V_{18}$ Solenoid Valve
$L_1$ to $L_{18}$ Heat Medium Lines

The invention claimed is:

1. A leakage inspection method of a heat exchanger where a plurality of heat transfer tube bundles for heat recovery or heat exchange are disposed with predetermined intervals in a gas flowing direction of a flue gas, the leakage inspection method comprising:
providing headers for common heat medium that are provided at a front and a back of each of the heat transfer tube bundles to distribute a heat medium to each of the heat transfer tube bundles which constitute the heat transfer bundles, heat medium lines that allows the headers for common heat medium and each of the heat transfer tube bundles to be connected to each other and that are provided with solenoid valves which supply and stop the heat medium to each of the heat transfer tube bundles;
performing control for operating the solenoid valves during a leakage of the heat medium;
stopping the inflow of the heat medium into a specific heat transfer tube bundle;
confirming normal operation of the heat transfer tube bundle in which inflow of the heat medium has not been stopped;
considering a temperature of the heat medium which circulates at the time of the stop;
correcting a density of the heat medium from the temperature of the heat medium;
determining a change in a liquid level of a heat medium tank which supplies the heat medium with the corrected density; and
performing a leakage inspection of the heat medium, wherein
the performing of the leakage inspection of the heat medium includes:
(i) determining that there is no leakage in the specific heat transfer tube bundle in which the inflow of the heat medium is stopped when the change in the liquid level of the heat medium tank is determined even though the inflow of the heat medium into the specific heat transfer tube bundle is stopped; and
(ii) determining that there is a leakage in the specific heat transfer tube bundle in which the inflow of the heat medium is stopped when the change in the liquid level of the heat medium tank is not determined even though the inflow of the heat medium into the specific heat transfer tube bundle is stopped.

2. The leakage inspection method of the heat exchanger according to claim 1, wherein the stopping of the inflow of the heat medium into the specific heat transfer tube bundle is performed for other heat transfer tube bundles.

* * * * *